United States Patent [19]
Naaktgeboren

[11] Patent Number: 5,919,373
[45] Date of Patent: Jul. 6, 1999

[54] METHOD AND SYSTEM FOR PURIFICATION OF POTABLE WATER

[76] Inventor: C. Lee Naaktgeboren, 1944 Belmont Pkwy. NW., Cedar Rapids, Iowa 52405

[21] Appl. No.: 08/931,372

[22] Filed: Sep. 16, 1997

[51] Int. Cl.⁶ ........................................................ C02F 1/74
[52] U.S. Cl. .......................... 210/750; 210/758; 210/109; 210/205
[58] Field of Search .................... 210/721, 722, 210/758, 101, 109, 117, 136, 205, 89, 750; 261/DIG. 71, DIG. 75

[56] References Cited

U.S. PATENT DOCUMENTS

| 2,872,415 | 2/1959 | Schleyer et al. ........................ 210/750 |
| 3,151,064 | 9/1964 | Lathrop . |
| 3,465,881 | 9/1969 | Rogers . |
| 3,482,604 | 12/1969 | Fleckenstein et al. . |
| 4,136,032 | 1/1979 | Bakken et al. . |
| 4,313,825 | 2/1982 | Fleckenstein et al. . |

FOREIGN PATENT DOCUMENTS 1504226  8/1989  U.S.S.R. .

OTHER PUBLICATIONS

Krudico, Inc. Air Charger Brochure.
Touch–Flo Manufacturing Co. Water Quality Products Brochure.

Primary Examiner—Jay H. Woo
Assistant Examiner—Frank Lawrence
Attorney, Agent, or Firm—Zarley, McKee, Thomte, Voorhees & Sease

[57] ABSTRACT

This invention presents a system and a method for the removal of unwanted contaminates such as hydrogen sulfate, nitrites, manganese and iron from potable water by the process of oxidization. The invention employs a common water softening system utilizing a specialized piston within the piston valve assembly to direct the flow of water throughout the system during normal use and during an air regeneration cycle and check on the water intake line and air intake line to prevent the escape of pressurized air trapped within the tank.

17 Claims, 7 Drawing Sheets

METHOD AND SYSTEM FOR PURIFICATION OF POTABLE WATER

BACKGROUND OF THE INVENTION

This invention relates to the method and system for the removal of certain impurities from potable water for use in business, industry and homes. The invention is useful in removing hydrogen sulfide, nitrates and iron from the water intended for human consumption. The invention may be used in conjunction with water softening equipment, or it may be used independent therefrom.

In many areas, the water consumed by the public and used in business and industry contains bacteria which consume sulfate ions producing hydrogen sulfide. As water is dispensed for use, the hydrogen sulfide becomes gaseous producing an odor often described as the "rotten egg" odor. Many consumers have had to tolerate this unpleasant odor in their potable water for years.

There exists three primary methods for treating potable water permeated with hydrogen sulfide. The first utilizes a simple large venturi assembly affixed to the intake water line which will operate to continuously introduce air into the water storage tank as water passes through the intake line. A significant disadvantage associated with this system is its dramatic reduction in the rate of flow of water passing through the intake line to the tank. This dramatic reduction in the flow rate is required in order to create the vacuum necessary to draw oxygenated air into the intake water line by way of the venturi assembly. By severely limiting the intake flow of water, this system is dysfunctional for many household, business and industry uses.

A second system utilizes chemical treatment of the contaminated water. Historically, oxidizers such as chlorine based chemicals or potassium permanganate based chemicals were utilized in this process. The disadvantages associated with this process involve the initial expenditure for equipment along with the continuous expense for chemicals.

A third system exists for treating water permeated with hydrogen sulfide which utilizes a series of tanks in conjunction with a mechanical air compressor. With this system the air compressor is required to operate extensively in order to continuously regenerate the oxygenated air supply within the tanks and to maintain adequate pressurization within the water tanks. This system requires a high initial investment, and represents higher operational costs associated with the extensive use and maintenance of the mechanical air compressor as compared to the current invention. This system is demonstrated by U.S. Pat. No. 3,151,064.

Additionally, various water treatment systems exist for softening water. These water treatment systems remove minerals dissolved in the water by an ion attraction process while passing the water through resin bead bed. Periodically, the resin bed must be flushed with a brine solution to wash away the captured minerals. Many water treatment systems utilize timing devices linked to plunger mechanisms which allow the consumer to soften their water in a controlled and convenient manner. In U.S. Pat. No. 4,313,825, a timing controlled mechanism is utilized which will allow the operator to preset the water treatment times or which will trigger the water treatment process based upon the amount of water usage. U.S. Pat. No. 3,482,604 utilizes a piston type valve assembly for directing the flow of water undergoing the treatment process through the treatment apparatus. A more elaborate piston-valve assembly is demonstrated in U.S. Pat. No. 3,465,881. Each of these systems are designed to deal with the multiple cycles associated with regeneration of resins within the water softening apparatus and repressurization of tanks.

SUMMARY OF THE INVENTION

The present invention presents a controlled cycle mechanism for water decontamination removing certain unwanted dissolved elements such as hydrogen sulfate, nitrites, manganese and iron. This invention allows the consumer maximum flexibility with a minimum of operational expense. Rather than utilizing mechanically compressed air, the current invention utilizes water flow control to regenerate the supply of oxygen present within the air trapped inside of the tank and to pressurize the water storage tank. As water flows into the tank, it is dispersed by a dispersing baffle affixed near the top of the distributor allowing the water to free-fall through the oxygenated air trapped in the top of the tank. By exposing the incoming water to oxygenated air within the tank, hydrogen sulfide molecules present within the water are oxidized, turning to hydrogen sulfate molecules. This transformation eliminates the unpleasant odor associated with the presence of hydrogen sulfate. This process removes oxygen from the air supply within the tank necessitating the regeneration of the air supply so as to ensure that the needed oxygen is available.

Another benefit associated with this invention is the elimination of nitrites in water that has been contaminated with fertilizers or other sources of nitrogen. This action also occurs by the process of oxidization altering the molecular structure of the nitrite molecules.

Further, this invention aides in the removal of dissolved iron and manganese from the water supply. Some water supplies have a high content of dissolved iron and manganese which exist as ions in the dissolved state (ferris). These ions react readily with oxygen to create a precipitate (ferric). As water containing dissolved iron and manganese drops through the oxygenated air contained within the tank, it is transformed to the solid precipitate which then can be filtered out of the water by conventional water softening equipment or other means. Accordingly, in a simple and inexpensive manner the present invention quickly removes certain contaminates from water to be consumed within the home, business or industry. Additional benefits associated with the use of this invention is the lowering of the pH and reduction of staining associated with the water.

The present invention utilizes a commercially available powerhead, the Model 5600 Control Valve Assembly manufactured by Fleck Controls. Within the industry the powerhead is also referred to as the control assembly. A unique feature presented in this invention is the design of a specialized piston utilized within the piston valve assembly to control the flow of water during the air regeneration cycle. The specialized piston allows for the water flow to draw in oxygenated air, equalize pressures between the tank and intake water line, and pressurize the interior of the tank to facilitate the delivery of water to the consumer. The amount of water necessary to accomplish this regeneration/ pressurization process is approximately 20 gallons. In conjunction with the use of this specialized piston, the invention utilizes a water intake check valve to prevent the escape from the tank of pressurized air upstream. Additionally, an air intake valve is utilized as a backup to the water intake check valve to prevent the escape of pressurized air. The system is simple, inexpensive and effective in decontaminating water by the process of oxidation.

The powerhead of the system has a timer wheel driven by an electric motor and a skipper wheel assembly for setting the days upon which the regeneration cycle will be activated. These settings are normally dependent upon the water usage by the consumer. The timer wheel can be set to initiate the air regeneration cycle of the invention any time within the 24 hours of the day. This usually occurs at night when no water consumption is occurring. At the predetermined time, the air regeneration process begins by the actuation of the specialized piston valve which opens up a port drawing water out of the tank and down the drain. After this flow path is established, the powerhead opens the air intake valve. Air is introduced into the intake line flowing into the tank and replacing the air supply within the tank as the water level drops. During this regeneration process a bypass port is opened by the positioning of the specialized piston valve so as to maintain the availability of water to the consumer, should it be needed.

After a period of time adequate to draw a sufficient volume of air into the tank, the air intake valve closes. Water is still routed through the air intake valve assembly, however, to equalize the pressure in the intake line and the tank. As the specialized piston valve continues to close towards the home position, the port routing water through the air intake valve assembly is closed, and the port routing water directly into the tank is opened. The water enters the top of the tank and is dispersed by a baffle allowing it to free-fall through regenerated air supply within the tank. As the volume of water increases within the tank, the air trapped within the upper portion of the tank is compressed. This pressurizes the water within the tank allowing for the pressurized flow of water throughout the consumer's premises on demand. At the home position the specialized piston valve routes the intake water through the tank where the water is exposed to the oxygen to remove the contaminates, thereafter flowing directly into the water system of the consumer.

DESCRIPTION OF THE PREFERRED EMBODIMENT OF THE INVENTION

Figure 4:
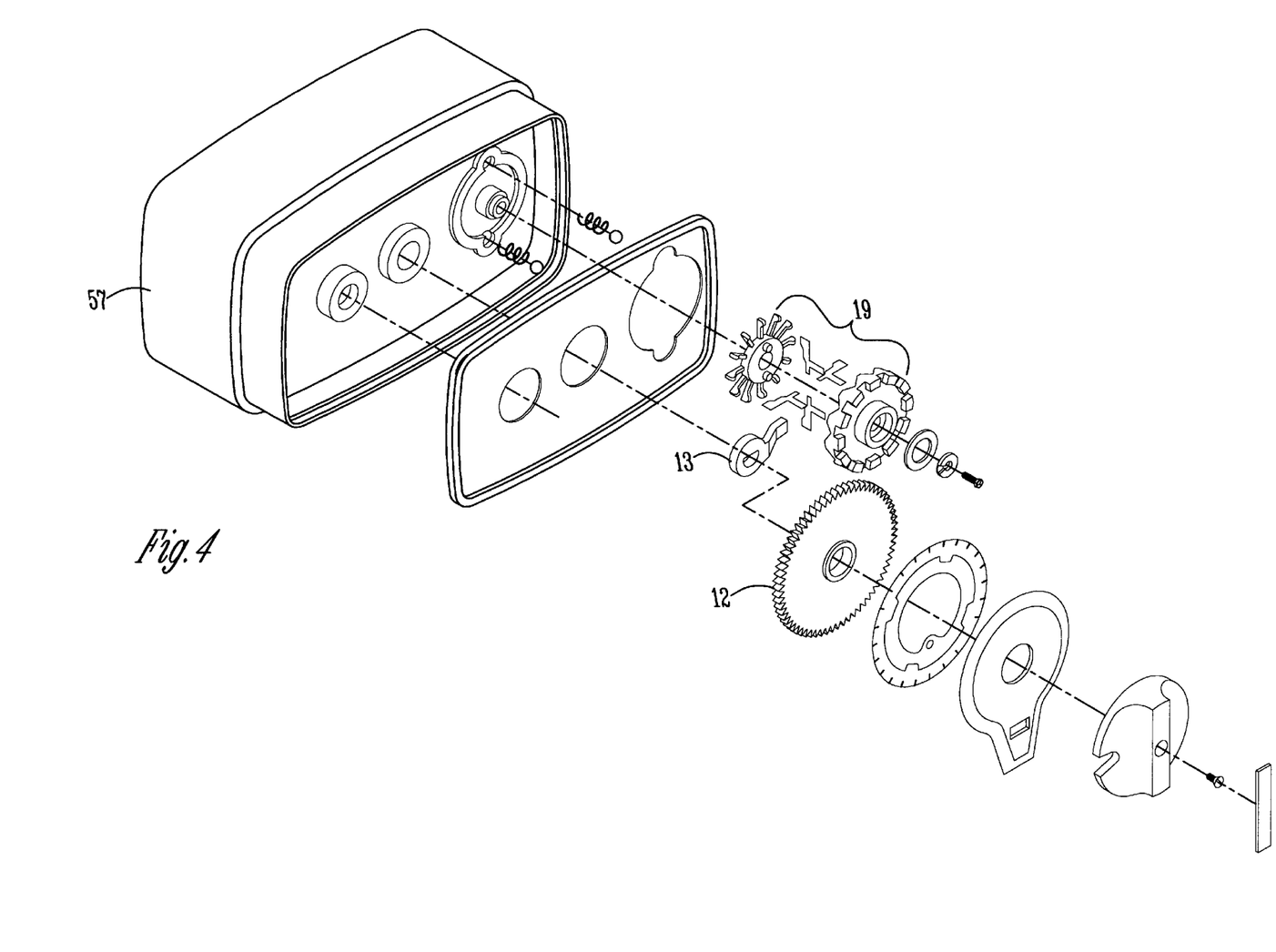
FIG. 4 is an exploded view of the front portion of the powerhead showing the casing, 24 hour gear, and skipper wheel assembly.
Figure 5:
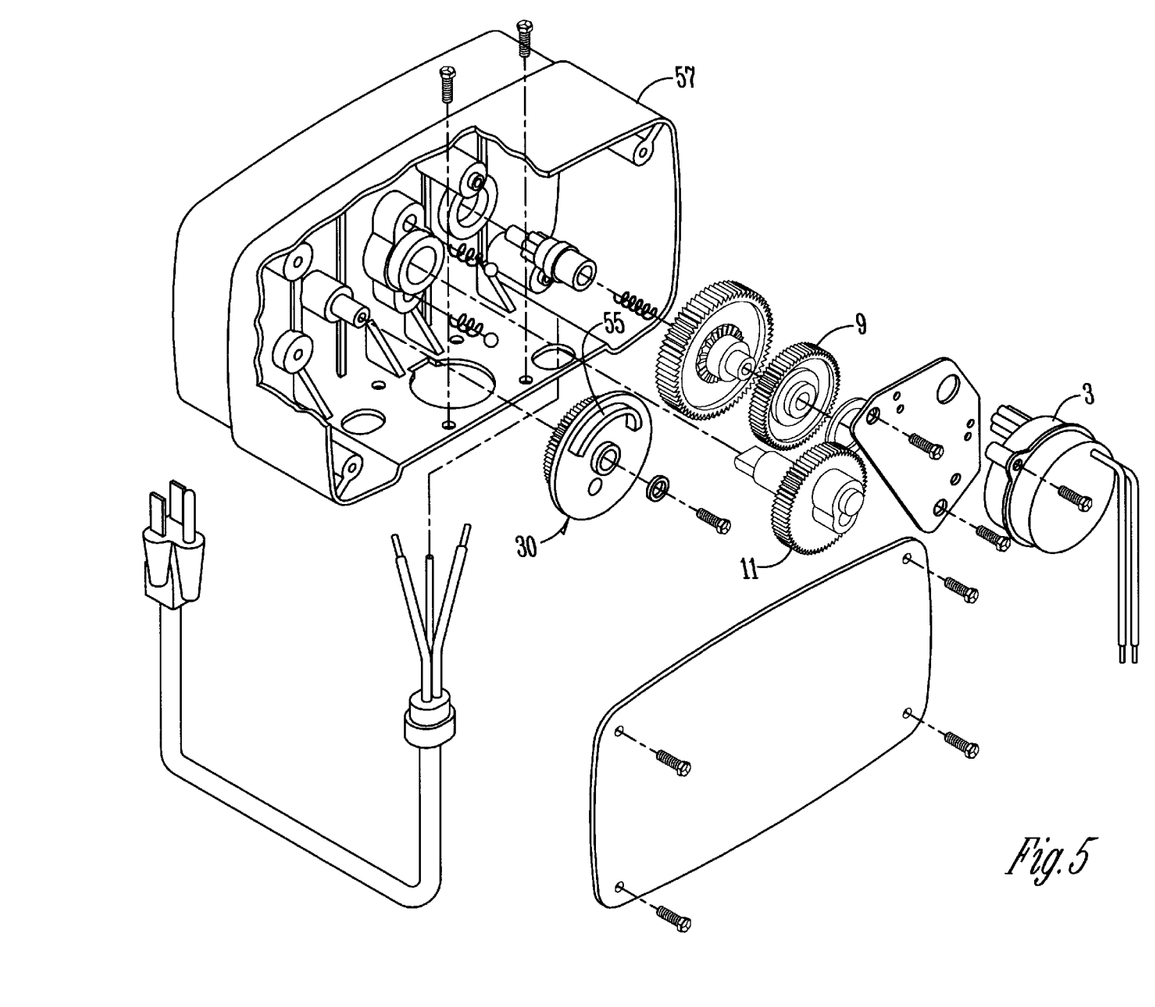
FIG. 5 is an exploded view of the rear portion of the powerhead showing the electric motor, main gear and shaft, and air intake gear.

The powerhead shown in FIG. 4 and FIG. 5 provides an electrically controlled mechanism for actuating the air regeneration and tank repressurization process. A 24-hour gear 12 functions to allow the process to begin at any time during the day or evening. In presetting the cycle actuation time, the consumer also controls the days on which the air regeneration cycle would occur by making the desired settings on the skipper wheel assembly 19. The skipper wheel assembly 19 in conjunction with the cycle actuator arm 13 functions to engage the main gear and shaft 11 with the drive gear 9 which is powered by the electric motor 3. The 24-hour gear 12 is also powered by an electric motor 3. Once engaged with the drive gear 9, the main gear and shaft 11 rotatably powers the air intake gear 30 which functions to open the air intake valve 40 through which air is drawn by the vacuum created by the flow of intake water through the venturi assembly 41.

Figure 6:
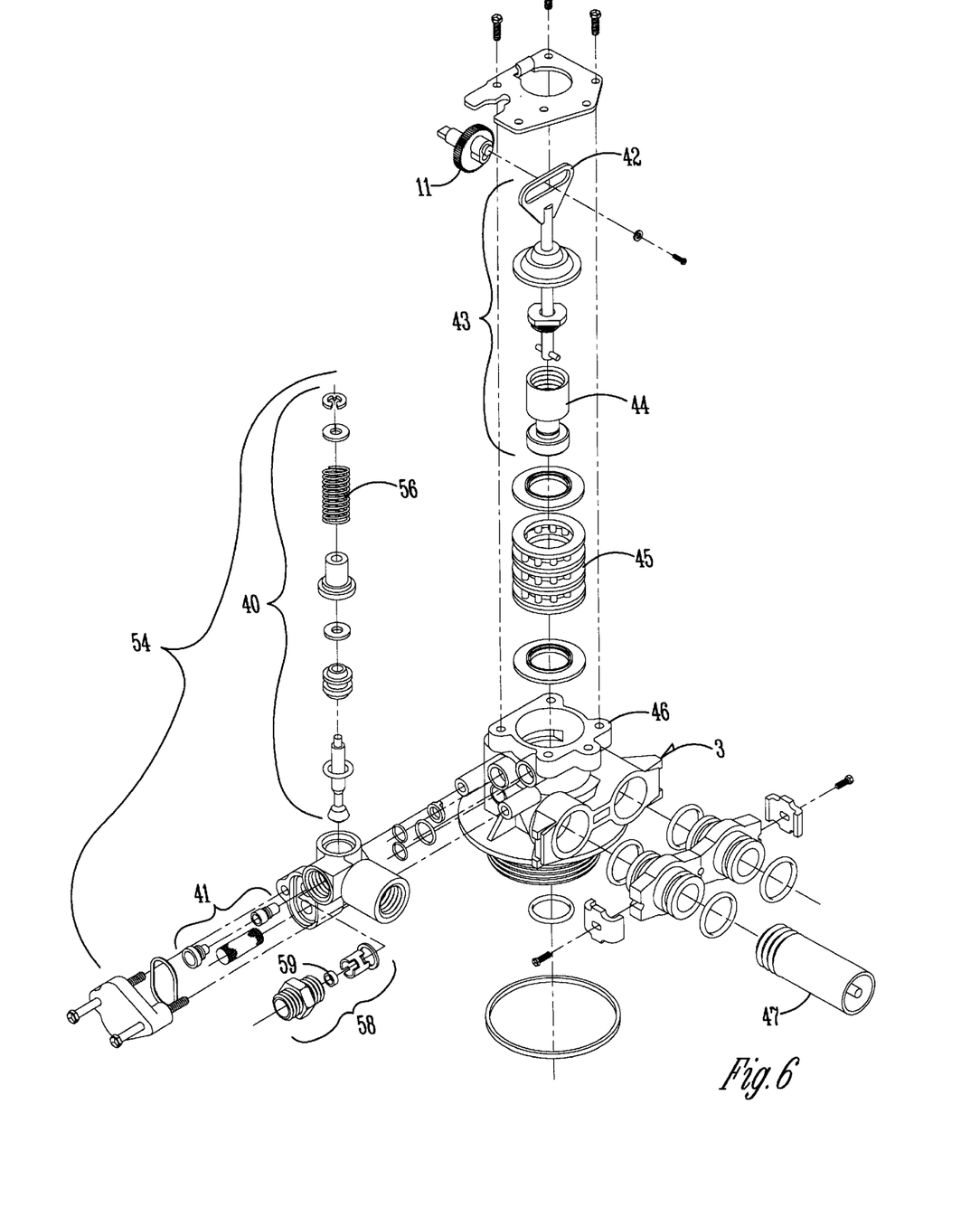
FIG. 6 is an exploded view of the water routing system which includes the air intake assembly, specialized piston assembly, and water intake check valve.
Figure 7:
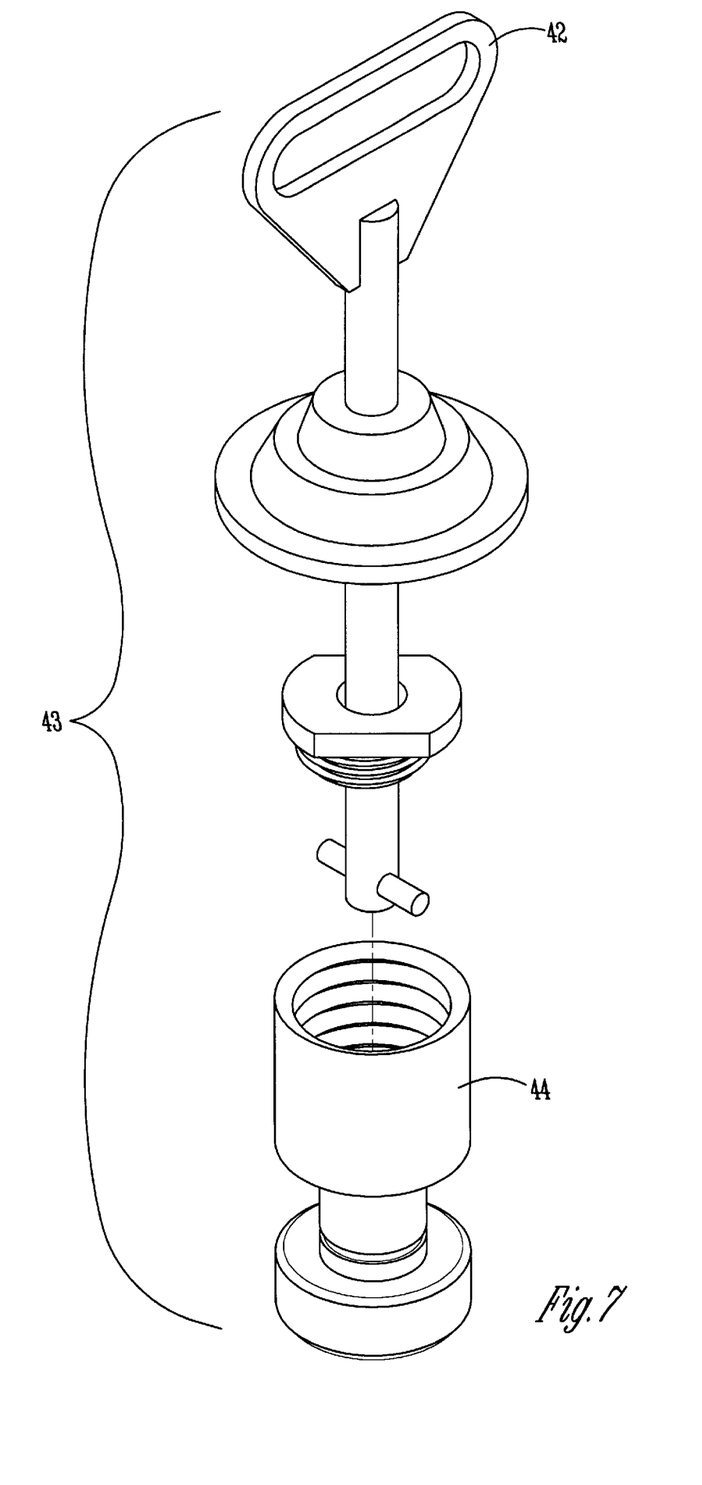
FIG. 7 is an exploded view of the specialized piston.

The location of the shaft on the main gear and shaft 11 is off-set and affixed to the washer head 42 of the specialized piston assembly 43. As it rotates, the off-center connecting point forces the specialized piston 44 downwardly. The specialized piston 44 moves within the gate spacers 45 and functions to close and open gates directing the flow of water through the appropriate gate within the flow control assembly 46 to complete the desired function.

Figure 1:
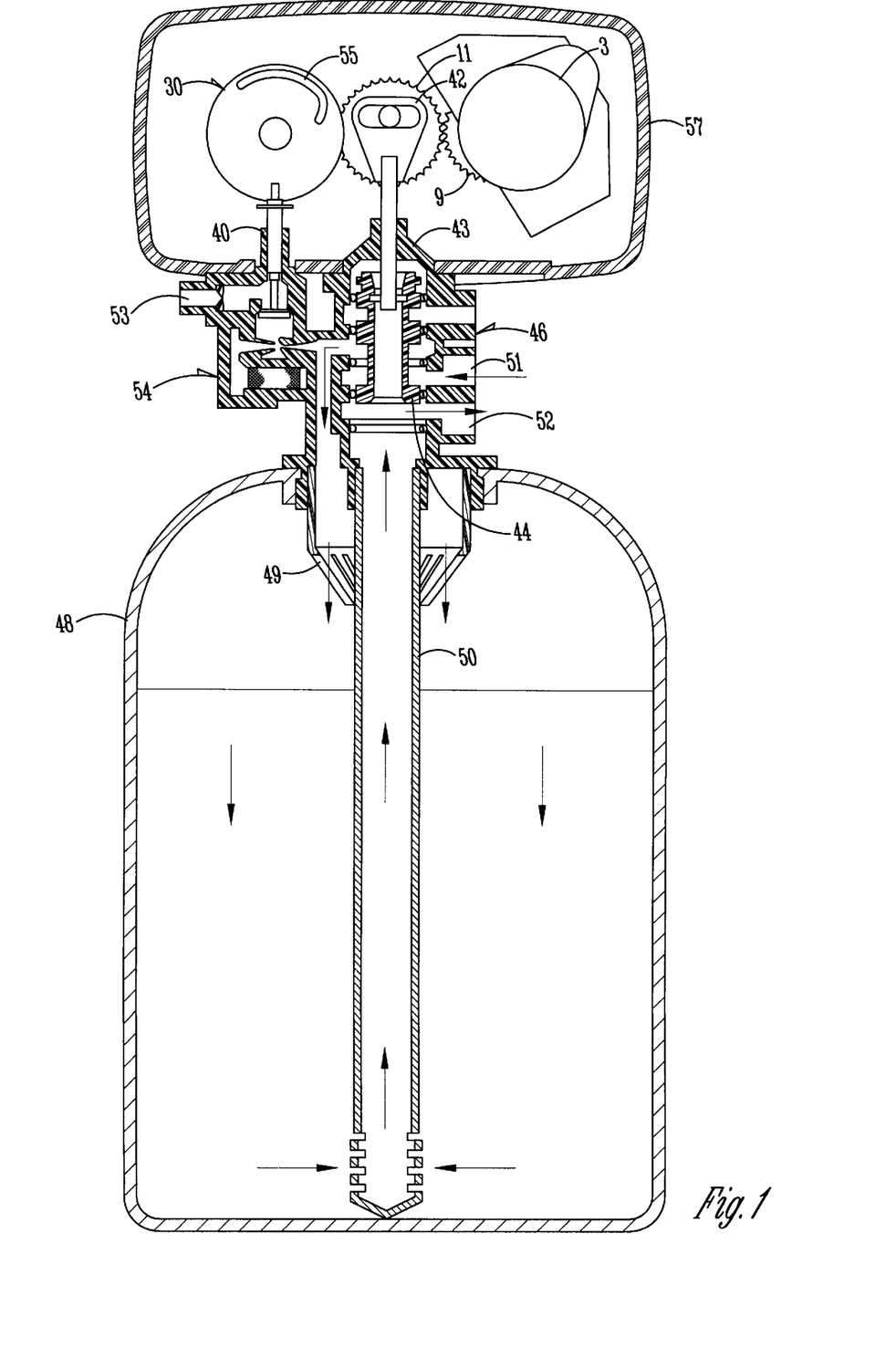
FIG. 1 is a perspective cut-away view of the water decontamination system showing the powerhead assembly, air intake assembly, flow control assembly and tank during the in-use cycle.
Figure 2:
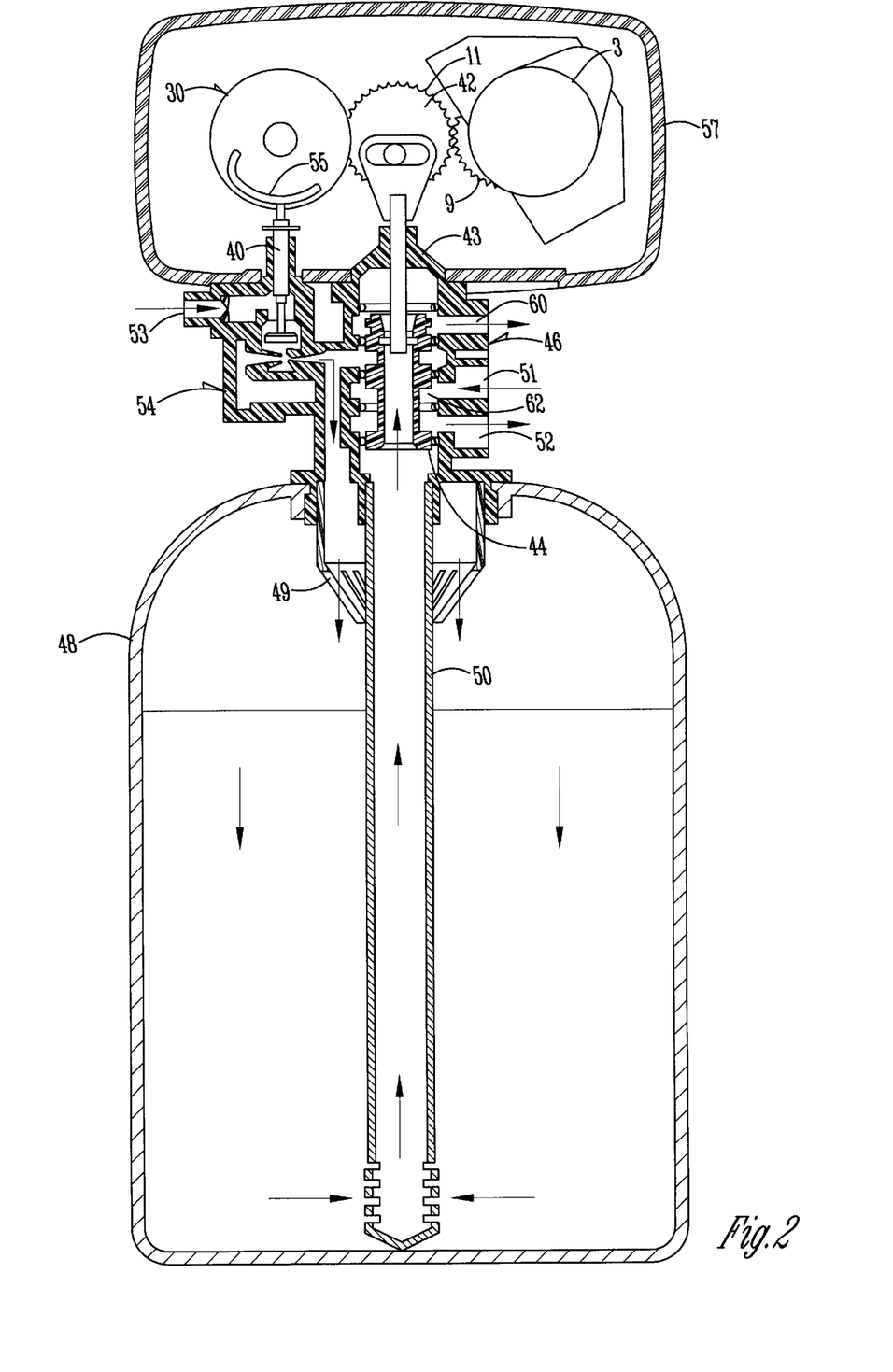
FIG. 2 is a perspective cut-away view of the water decontamination system during the air regeneration cycle.
Figure 3:
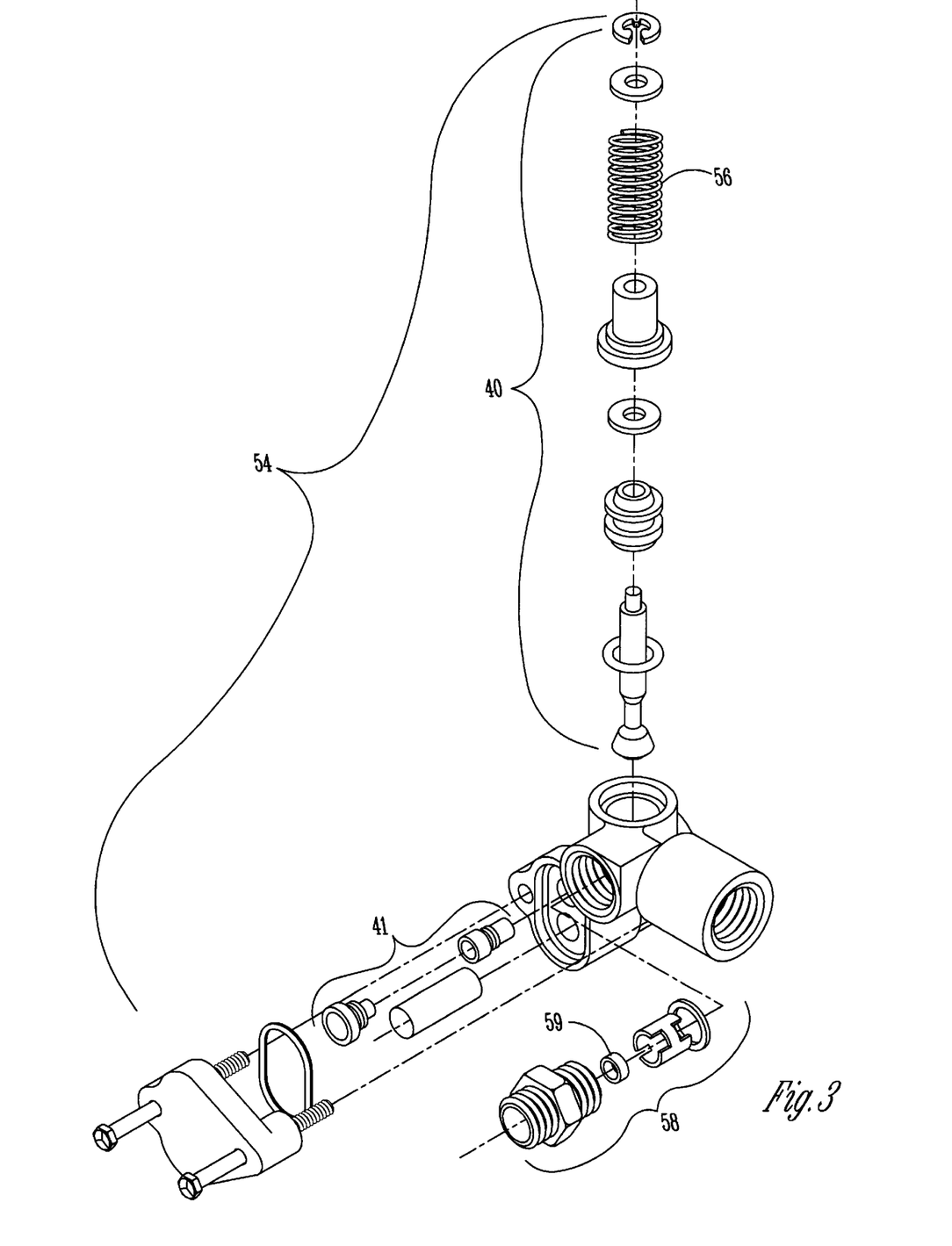
FIG. 3 is an exploded view of the flow control assembly adjacent to the air intake assembly which air intake assembly includes a venturi assembly and an air intake check valve assembly.

A water intake check valve 47 is affixed to the water intake line. Water flows through the water intake check valve assembly into the flow control assembly 46. When the regeneration cycle is not operating, the intake water flows through the intake port 51 and is directed by the specialized piston 44 located at its home position into the top of the tank 48 where is dispersed by the dispersing baffle 49 positioned near the top of the distributor 50 and free-falls through the oxygenated air at the top of the tank 48. When the regeneration cycle is activated, the specialized piston 44 moves downwardly from its home position closing the outflow port which allows water to pass directly into the tank and out to the premises of the consumer. As depicted in FIG. 2, in closing the outflow port 52, the specialized piston opens a bypass port 62 which allows for the flow of water directly from the intake line to the outflow line providing a supply of water to the consumer should it be needed. As the specialized piston 44 is moved downward from the home position, the air intake assembly port 53 and drain port are also opened which route intake water through the air intake assembly 54, through the tank 48, out the distributor 50, and down the drain line, thus continuously drawing water out of the tank 48. As the main gear and shaft 11 continues to rotate, it rotates the air intake gear 30 thereby moving the position of the cam ridge 55. The cam ridge 55 on the air intake gear 30 operates to open the air intake valve 40. After the downward movement of the specialized piston 44 from its home position continues, a port is opened routing in flow water through the air intake assembly 54. As water flows through the venturi assembly 41 contained within the air intake assembly 54, a vacuum is created drawing air through the open air intake valve 40 into the water intake line. The water and air mixture then flow out of the air intake assembly 54 directed by the specialized piston 44 through the dispersing baffle 49 into the tank 48. As water is continuously drained from the tank 48, the level of water continuously decreases with the volume of air inside of the tank 48 continuously increasing.

As the main gear and shaft 11 continues to rotate, thereby rotating the air intake gear 30, the cam ridge 55 terminates allowing the air intake valve 40 to snap to the closed position by operation of its spring 56. As the main gear and shaft 11 continues toward completion of its rotation, the specialized piston 44 is drawn upwardly progressing toward the home position. This upward movement of the specialized piston 44 first closes the drain port 60 directing water from the tank 48 to the drain, thus allowing the tank to fill with water compressing the air trapped at the top of the tank creating pressure within the tank 48. As the specialized piston 44 continues its upward travel, the air intake assembly port is next closed as the tank intake port is opened, allowing intake water to flow directly into the tank 48. The continuous upward movement of the specialized piston 44 allows for a smooth transition in closing the air intake assembly port and opening the tank intake port, which transition facilitates the equalization of pressure in the water line with the pressure within the tank 48 preventing a water hammer effect. In returning to its home position, the specialized piston 44 closes the bypass port and opens the outflow port 52 allowing for the flow of water through the tank 48 and out to the water system of the premises.

At the completion of the cycle the air trapped within the tank 48 has been completely replaced thus providing a new supply of oxygen through which the incoming water will free-fall, thus removing certain contaminates from the water. Additionally, the air within the tank is compressed by the volume of water introduced into the tank 48 thereby pressurizing the water to facilitate its ready flow to the consumer on demand.

The control assembly is comprised of the powerhead 57 (as depicted in FIG. 4 and FIG. 5, collectively), flow control assembly 46 and air intake assembly 54 A commercially available control assembly (as modified) used in water softening equipment may be utilized to practice this invention. The Model 5600 control valve drive assembly available from Fleck Controls is the control assembly by which the invention described above may best be utilized.

Again, the first of the three required modifications to the control assembly requires the installation of the water intake check valve assembly 47 to the water intake line thereby preventing the escape of pressurized air within the tank 48 up the intake water line; the modification of the BLFC fitting to create the air intake check valve 58 by eliminating the flow control washer and substituting in its place a solid, cylindrical rubber stopper 59 thereby preventing the escape of pressurized air; and use of the specialized piston 44 in the piston valve assembly 43, which specialized piston 44 directs the flow of water to accomplish the air regeneration and water replacement/pressurizationcycle.

In addition to these modifications to the control assembly, the distributor 50 customarily used in water softening tanks is also modified. This modification consists of securing a dispersing baffle 49 near the top of the distributor 50. As water enters the tank 48 at the top, it would normally flow down the exterior of the distributor 50. With this modification the water flows into the dispersing baffle 50 having a continuous series of slits arranged around its bottom thereby separating the water into free-falling droplets passing through the oxygenated air contained at the top of the tank 48.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

I claim the following:

1. A system for the oxidation of contaminates including hydrogen sulfide, nitrates, iron and manganese from a potable water supply, said system comprising;

a tank having a water inlet and a water outlet;

a powerhead combined with the tank to periodically initiate and control an air regeneration cycle;

a flow control assembly to divert a flow of intake water within the system;

a piston valve assembly combined with the flow control assembly and operatively connected to the powerhead for controlling the flow of intake water within the system;

an air intake assembly operatively connected to and actuated by the powerhead during the air regeneration cycle; and a venturi assembly combined with the air intake assembly and through which intake water passes during the air regeneration cycle so as to create a vacuum to draw air through the air intake assembly into the intake water traveling through the air intake assembly into the tank.

2. The apparatus of claim 1 wherein the piston valve assembly includes a piston moveable within the piston valve assembly to alter the course of water inflowing to the tank and outflowing from the tank to provide for water to be drained from the tank as a new air supply is drawn into the tank, thereafter providing for the continuous flow of water into the tank to compress the volume of air while filling the tank with water and pressurizing the water.

3. The apparatus of claim 2 wherein the air intake assembly includes an air intake check valve to prevent the escape of air from the tank as the water volume increases thereby compressing the air and pressurizing the tank.

4. The apparatus of claim 2 wherein a water intake check valve is combined with the flow control assembly thereby preventing the escape of air from the tank as water flows into the tank so as to compress the air and pressurize the tank.

5. A method of periodically regenerating air for degasification through oxidation of water in a water treatment tank having a water inlet, a water outlet, and a water drain, the method comprising:

draining water from the tank through the water drain;

opening an air inlet on the tank at a preset time for a specified period of time;

directing water from the water inlet to a venturi associated with the air inlet so as to draw air into the water;

directing the air and water into the tank so as to replenish the air in the tank;

closing the air inlet;

closing the drain; and passing water from the water inlet through the air in the tank so as to degasify the water by oxidation and so as to fill the tank thereby pressurizing the air in the tank.

6. The method of claim 5 further comprising diverting a portion of water from the water inlet to the water outlet, without passing through the tank, upon demand from a consumer while the air inlet is open.

7. The method of claim 5 wherein the opening and closing of the air inlet is regulated by a piston valve assembly.

8. An improved method of degasifying water through oxidation for consumer use, the method including the steps of passing impure water through oxygenated air in a water tank so as to oxidize the impurities and thereby improve water quality, the improvement comprising:

periodically supplying fresh oxygenated air to the tank without simultaneously drawing water from the tank for consumer use, and stopping a drainage of water from the tank and supplying additional impure water to the tank after the fresh oxygenated air has been supplied, thereby pressurizing the air in the tank.

9. The improved method of claim 8 wherein the periodic supply of fresh oxygenated air occurs at regular timed intervals.

10. The improved method of claim 8 further comprising draining water from the tank before supplying the fresh oxygenated air.

11. The improved method of claim 8 further comprising bypassing water from a water intake port to a water outflow port, without passage through the tank, as the fresh oxygenated air is supplied to the tank.

12. The improved method of claim 8 wherein the fresh oxygenated air is supplied by venturi action.

13. A method for degasification through oxidation of water in a water system in which water is contained in a water treatment tank having an intake port for the intake flow of water into the tank, an outflow port providing for outflow of water from the tank into the water system and a discharge port providing for flow of water from the tank into a drain, said method comprising the steps of:

discharging the water contained in the tank through the discharge port into the drain so as to empty the tank;

passing intake water through an air intake assembly at a preset time so as to mix oxygenated air into the intake water;

directing the mixture of air and intake water into the tank;

discontinuing the mix of air into the intake water after a predetermined amount of time;

stopping the discharge of water from the tank so as to allow for the accumulation of intake water in the tank, thereby compressing the air trapped within the tank; and passing the intake water through the oxygenated air in the tank so as to degasify the intake water by oxidation.

14. The method of claim 13 further comprising diverting the intake flow of water so that intake water flows directly into the water system of a consumer on demand without entering the tank while simultaneously providing for the introduction of air into the flow of intake water.

15. The system of claim 1 further comprising a distributor positioned within said tank for drawing water from the tank and passing the water out of the tank through the water outlet.

16. The system of claim 1 further comprising a dispersing baffle positioned near the top of the distributor and under the water inlet to disperse the incoming water and provide for its free-fall through air in tank.

17. The system of claim 1 further comprising a drain outlet operatively connected to and controlled by the piston valve assembly to provide for the flow of water out of the tank and into a drain.

* * * * *